United States Patent Office 2,835,677
Patented May 20, 1958

2,835,677

4-SUBSTITUTED 1.2-DIARYL-3.5-DIOXO-PYRAZOLIDINES

Franz Häfliger and Rudolf Pfister, Basel, Switzerland, assignors to Geigy Chemical Corporation, New York, N. Y., a corporation of Delaware No Drawing. Application July 30, 1956
Serial No. 600,664

Claims priority, application Switzerland August 15, 1955

4 Claims. (Cl. 260—310)

The present invention is concerned with therapeutically valuable 4-substituted 1.2-diaryl-3.5-dioxo-pyrazolidines as well as the salts thereof with inorganic and organic bases, and the production thereof. 1.2-diphenyl-4-n-butyl-3.5-dioxo-pyrazolidine has already attained great importance as a therapeutic agent for the treatment of rheumatic disorders. Of the patents with regard thereto, e. g. British Patent 646,597, French Patent 983,378, German Patent 814,150 and U. S. Patent 2,562,830, in general 1.2-diaryl-3.5-dioxo-pyrazolidines are embraced which are substituted in 4-position by a carbon structure having 2-10 carbon atoms by way of a primary or secondary carbon atom.

It has now been found that compounds of the general formula:

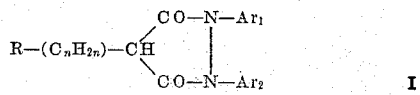

wherein $Ar_1$ and $Ar_2$ represent phenyl radicals which may be substituted by lower alkyl, alkoxy or alkylmercapto groups or by halogen, R represents a heterocyclic radical in the lowest stage of hydrogenation, and $n$ represents a low whole number, also have therapeutically valuable properties, in particular antipyretic, antiphlogistic and analgetic activity. By a heterocyclic radical in the lowest stage of hydrogenation is meant one containing the greatest possible number of double linkages, c. f. Patterson and Capell, Ring-Index, page 16.

These new compounds are produced in principle by ring-closing condensation of reactive functional derivatives of correspondingly substituted malonic acids with hydrazobenzene or diphenyl hydrazine compounds which, if desired, may be substituted. The production is therefore characterised in that (a) a substituted malonic acid ester of the general formula:

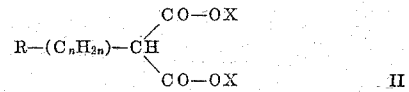

wherein R and $n$ have the meanings given above and X represents a radical easily split off as —OX, in particular, a lower alkyl radical, is reacted in the presence of a condensing agent with hydrazobenzene or a reactive substituted diphenyl hydrazine of the formula:

wherein $Ar_1$ and $Ar_2$ have the meanings given above and the H atoms bound to the N can be completely or partly replaced by substituents which can be easily split off such as acyl radicals, alkali metal atoms, magnesium monohalogenide radicals, or (b) a substituted malonic acid derivative of the general formula:

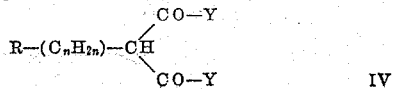

wherein Y represents chlorine, bromine or an acyloxy radical and R and $n$ have the meanings given above, is reacted in the presence of an acid binding agent with a hydrazobenzene as defined above, or (c) a substituted malonic acid ester derivative of the general formulae:

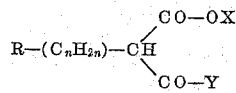

or

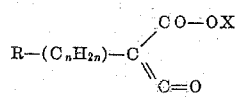

wherein R, $n$, X and Y have the meanings given above, or the dimer of the latter is reacted with a hydrazobenzene as defined above, the reaction being performed if necessary first in the presence of an acid binding agent and then, for the ring-closure, in the presence of a condensing agent.

Alkali metals or compounds thereof such as alcoholates, amides, hydroxides or hydrides can be used as alkaline condensing agents for the first production process mentioned. The condensation is performed advantageously in the presence of organic solvents such as, e. g. benzene, toluene, xylene etc. and at a raised temperature, preferably between 80–160° C., any alcohol liberated being continuously distilled off. In particular tertiary organic bases such as pyridine or dimethyl aniline, triethyl and also tributyl amine are suitable acid binding agents for the second reaction mentioned above. The reaction can be performed in the presence or absence of additional organic solvents, such as, e. g. diethyl or di-isopropyl ether or chloroform. In this case, the ring is closed already at low temperatures, advantageously in the region of 0°.

The substituted malonic acid diesters of the general Formula II necessary for the reaction can be produced for example by condensing sodium malonic acid diesters with heterocyclic-aliphatic halogen compounds of the formula R—($C_nH_{2n}$)-halogen. Such halogen compounds can be produced, e. g. from the corresponding hydroxy compounds by treatment with inorganic acid halides, some of which compounds are known.

Heterocyclically substituted malonic acid diesters as defined can also be produced by condensing heterocyclic aldehydes with malonic acid diesters or by condensing heterocyclic compounds which contain a reactive methyl group with mesoxalic acid diesters. In both cases, the condensation is followed by hydrogenation or reduction of the heterocyclically substituted methylene malonic acid diesters obtained as condensation products.

The substituted malonic acid dihalides of the Formula IV are obtained from the esters by alkaline saponification, liberation of the acids and treatment thereof with inorganic acid halides such as thionyl chloride, phosphorus pentachloride or phosphorus tribromide.

Examples of substituted malonic acid diesters of the general Formula II are: [furyl-(2)-methyl]-, [γ-furyl-(2)-propyl]-, [α-furyl-(2)-butyl]-, thenyl-, [β-thienyl-(2)-ethyl]-, α-picolyl-, γ-picolyl-, [β-pyridyl-(2)-ethyl]-, [β-pyridyl-(4)-ethyl]-, [indolyl-(3)-methyl]-, [1-methyl-indolyl-(3)-methyl]-, [quinolyl-(2)-methyl]-, [quinolyl-(4)-methyl]-, [β-quinolyl-(2)-ethyl]-, [4-methyl-imidazolyl-(5)-methyl]- and thiazolyl-(5)-methyl-malonic acid dimethyl esters and diethyl esters.

Apart from hydrazobenzene and the N-acetyl and N.N′-diacetyl derivatives thereof, 4-chloro-, 2.2′-dichloro-, 3.3′-dichloro-, 4.4′-dichloro-, 2.4-dichloro-, 4-bromo-, 2.2′-dibromo-, 3.3′-dibromo-, 4.4′-dibromo-, 3.5-dibromo-, 2-methyl-, 3-methyl-, 4-methyl-, 2.2′-dimethyl-, 3.3′-dimethyl-, 4.4′-dimethyl-, 4-methyl-4′-chloro-, 2.4-dimethyl-, 2.4.2'.4'-tetramethyl-, 3.4.3'.4'-tetramethyl-, 4.4'-bis. tert. butyl-, 2-ethoxy, 3-ethoxy-, 4-methoxy, 4-methoxy-4'-methyl-, 4-ethoxy, 4-ethoxy-4'-bromo-, 4-ethoxy-4'-methyl-, 3.3'-diethoxy-, 4.4'-diethoxy-, 2.2'-bis-methylmercapto-, 4.4'-bis-methylmercapto- and 4.4'-bis-ethylmercapto- hydrazobenzene can be used as hydrazobenzenes of the general Formula III, all of which have already been described in Beilstein, Handbuch der org. Chemie. Also the N-acetyl derivatives thereof and other hydrazobenzenes substituted according to the definition which can be produced in the manner described from the known compounds can be used. Hydrazobenzene compounds with alkali atoms or magnesium halide radicals at the N atoms which can be used as starting materials have also already been described, see, e. g. Berichte der deutschen chemischen Gesellschaft 38, 2716, and 68, 933.

Whereas in all the modifications of the process previously mentioned the ring-closing condensation leads directly to compounds which already contain the heterocyclic-aliphatic radical R—$(C_nH_{2n})$— according to the definition, this can also be subsequently introduced into existing pyrazolidine derivatives by condensing a 1.2-diaryl-3.5-dioxo-pyrazolidine of the general formula:

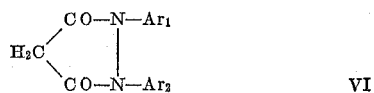

wherein $Ar_1$ and $Ar_2$ have the meanings given above, with a heterocyclic oxo compound of the general formula:

$$R—(C_nH_{2n-2})=O \qquad VII$$

wherein R and $n$ have the meanings given above, and then reacting either simultaneously or subsequently with catalytically activated hydrogen, e. g. with noble metal catalysts or Raney-nickel. 1.2-diaryl-3.5-dioxo-pyrazolidines of the general Formula VI can be produced in the same manner as described above for the 4-substituted compounds from unsubstituted malonic acid derivatives and hydrazobenzene or derivatives thereof; 1.2-diphenyl-, 1.2-bis-(p-methyl-phenyl)- and 1.2-bis-(p-methoxy-phenyl)-3.5-dioxo-pyrazolidine are known.

Examples of oxo compounds of the general Formula VII are: furfurol, pyridine-2-aldehyde, pyridine-3-aldehyde, pyridine-4-aldehyde, quinoline-2-aldheyde, quinoline-4-aldehyde and 1.3-dimethyl-pyrazole-5-aldehyde.

The greater part of the new 4-substituted 1.2-diaryl-3.5-dioxo-pyrazolidines are colourless, crystalline substances which dissolve easily in the usual organic solvents as well as in diluted aqueous alkalies, the latter due to the presence of an acid hydrogen atom, probably in the tautomeric enol form. Also the new compounds form salts with other inorganic as well as with organic bases.

The aqueous solutions of the alkali salts of the new compounds also have the effect of solubility promoters on pyrazole derivatives.

Use can be made of the excellent antiphlogistic and antipyretic activity of the new compounds, e. g. in the treatment of rheumatic diseases such as rheumatoid arthritis and acute gout. Of particular value are compounds substituted in the 4-position by a pyridyl-lower alkyl, thenyl or furfuryl radical. In peroral administration, e. g. in the form of tablets or coated tablets, 0.1–1.5 g. per day are sufficient and appropriate dosages. The new compounds may also be administered parenterally, e. g. by intramuscular injection of aqueous solutions of the sodium salts, other alkali salts or salts with organic bases such as diethylamino ethanol.

The following examples further illustrate the production of the new compounds. Parts are given as parts by weight and their relationship to parts by volume is as that of grammes to cubic centimetres. The temperatures are in degrees centigrade.

*Example 1*

(a) 78 parts of (γ-picolyl)-malonic acid diethyl ester (B. P.$_{·0.2}$=133°) are added to a sodium ethylate solution consisting of 7.1 parts of sodium and 142 parts by volume of abs. ethanol, and then 63 parts of hydrazobenzene are added. The alcohol is distilled off while stirring until the volume is half that of the original, 115 parts by volume of abs. xylene are added and distilling is continued for another 12 hours, the oil bath temperature being kept between 140 and 145°.

After cooling, 142 parts of water are stirred in. When all the reaction products are dissolved, the layers are separated, the aqueous phase is shaken out twice with a little chloroform, its reaction is made acid to litmus paper with 6 N-hydrochloric acid, the oil which precipitates is taken up in ether, the ethereal solution is washed first with a little water and then with saturated sodium chloride solution, dried with anhydrous sodium sulphate and evaporated. The residue is recrystallised twice from pyridine. The 1.2-diphenyl-3.5-dioxo-4-(γ-picolyl)-pyrazolidine obtained melts at 220°.

(b) 1.2-diphenyl-3.5-dioxo-4-[β-pyridyl-(4')-ethyl]-pyrazolidine is obtained in an analogous manner by using 5.8 parts of sodium, 120 parts by volume of abs. alcohol, 66 parts of [β-pyridyl-(4)-ethyl]-malonic acid diethyl ester (B. P.$_{·0.2}$=140°) and 50 parts of hydrazobenzene. This compound melts, after recrystallisation twice from ethanol, at 178°.

(c) By using 9 parts of sodium
150 parts by volume of abs. alcohol
100 parts of thenyl-malonic acid diethyl ester
(B. P.$_{·0.2}$=124°)
and
80 parts hydrazobenzene 1.2-diphenyl-3.5-dioxo-4-thenyl-pyrazolidine is obtained in an analogous manner. After recrystallising twice from ethanol, it melts at 171–173°.

(d) By using 1.7 parts of sodium
34.0 parts by volume of abs. alcohol
18.9 parts of (α-picolyl)-malonic acid diethyl ester (B. P.$_{·0.07}$=126°), and
14.0 parts of hydrazobenzene 1.2-diphenyl-3.5-dioxo-4-(α-picolyl)-pyrazolidine is obtained which, after recrystallising twice from ethyl acetate/ethanol, melts at 179–180°.

(e) If the hydrazobenzene used in paragraph (d) is replaced by 15.5 parts of 4.4'-dimethyl-hydrazobenzene, then 1.2-bis-(p-methyl-phenyl)-3.5-dioxo-4-(α-picolyl)-pyrazolidine is obtained in an analogous manner.

(f) If 18.5 parts of 4.4'-dimethoxy-hydrazobenzene are used instead of the hydrazobenzene according to paragraph (d), then 1.2-bis-(p-methoxyl-phenyl)-3.5-dioxo-4-(α-picolyl)-pyrazolidine is obtained in an analogous manner.

(g) By using 2.4 parts of sodium
50.0 parts by volume of abs. alcohol
28.9 parts of [indolyl-(3)-methyl]-malonic acid diethyl ester, and
20.0 parts of hydrazobenzene then 1.2-diphenyl-3.5-dioxo-4-[indolyl-(3')-methyl]-pyrazolidine is obtained in the manner described under (a).

(h) In the same manner, starting from 2.4 parts of sodium
50.0 parts by volume of abs. alcohol
26.5 parts of [β-pyridyl-(4)-ethyl]-malonic acid dialkyl esters, and
27.0 parts of 4.4'-dichloro-hydrazobenzene 1.2-bis-(p-chloro-phenyl)-3.5-dioxo-4 - [β - pyridyl - (4')-ethyl]-pyrazolidine is obtained.

Example 2

11.9 parts of thenyl malonic acid dichloride in 100 parts by volume of abs. ether and 12.1 parts of dimethyl aniline in 20 parts by volume of abs. ether are added simultaneously dropwise from two dropping funnels to a suspension of 9.2 parts of hydrazobenzene in 100 parts by volume of abs. ether, the additions being made at 0° while stirring. On completion of the additions, the whole is stirred for another 2 hours at 0°, then for an hour at room temperature and finally for one hour while boiling under reflux. After cooling, 200 parts of ether are added and the insoluble dimethyl aniline-hydrochloride is filtered off. The ethereal solution is extracted with 1 N-caustic soda lye, the alkaline solution is shaken out once with ether and then the pH is adjusted to 3 with hydrochloric acid. The 1.2-diphenyl-3.5-dioxo-4-thenyl - pyrazolidine which precipitates is filtered off under suction, washed with a little water, dried and then recrystallised several times from ethanol as described in Example 1(c).

Example 3

(a) 252 parts of 1.2-diphenyl-3.5-dioxo-pyrazolidine are heated with 96 parts of furfurol in 750 parts by volume of alcohol in a water bath. The 4-furfurylidene-1.2-diphenyl-3.5-dioxo-pyrazolidine soon begins to crystallise out. After filtering under suction and recrystallisation from glacial acetic acid, it melts at 153°. This compound, hydrogenated in an alcoholic solution in the presence of Raney-nickel under atmospheric pressure at 50°, produces 1.2-diphenyl - 3.5 - dioxo - 4 - [furyl - (2')-methyl]-pyrazolidine which melts at 163–164° after recrystallisation from ethanol.

(b) 13.25 parts of 1.2-bis-(p-methyl-phenyl)-3.5-dioxo-pyrazolidine and 4.6 parts of furfurol are condensed in an analogous manner in 70 parts by volume of alcohol. The 4-furfurylidene-1.2-bis-(o-methyl-phenyl)-3.5.-dioxo-pyrazolidine is recrystallised from ethyl acetate and then melts at 170–172°.

12.8 parts of this compound in 128 parts by volume of ethyl acetate and 1.3 parts of glacial acetic acid are hydrogenated in the presence of 0.1 part of platinum oxide, the hydrogenation being performed at 25° under atmospheric pressure. 1.2-di-(p-methyl-phenyl)-3.5-dioxo-4-[furyl-(2')-methyl]-pyrazolidine is obtained which, recrystallised from ethanol, melts at 167–168°.

What we claim is:

1. A 4-substituted 1.2-diaryl-3.5-dioxo-pyrazolidine of the formula:

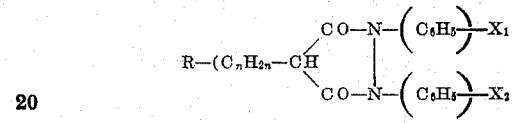

wherein each of $X_1$ and $X_2$ represents a member selected from the group consisting of hydrogen, methyl, methoxy and chlorine, R represents a member selected from the group consisting of pyridyl, thienyl and furyl radicals, and $n$ represents one of the digits 1 and 2.

2. 1.2-diphenyl-3.5-dioxo-4-(α-picolyl)-pyrazolidine.

3. 1.2-diphenyl-3.5-dioxo-4 - [β - pyridyl - (2') - ethyl]-pyrazolidine.

4. 1.2-diphenyl-3.5-dioxo-4-thenyl-pyrazolidine.

References Cited in the file of this patent

UNITED STATES PATENTS 2,700,670    Hafliger _____ Jan. 25, 1955

FOREIGN PATENTS 506,891    Belgium _____ Nov. 30, 1951